Figure 5:
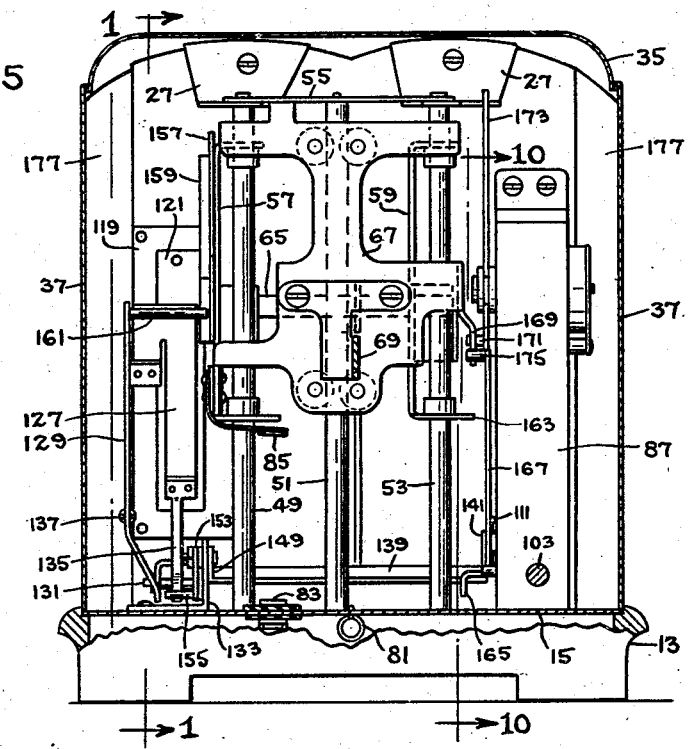

June 20, 1939.  R. SARDESON  2,162,899
AUTOMATIC TOASTER
Filed Feb. 28, 1938    3 Sheets-Sheet 1
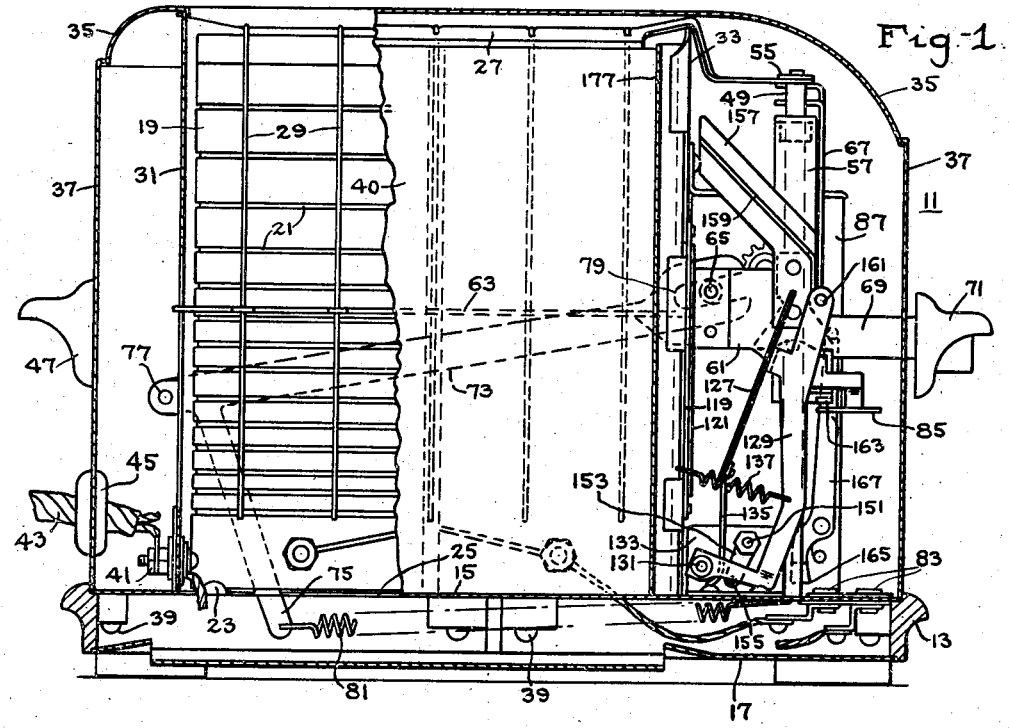
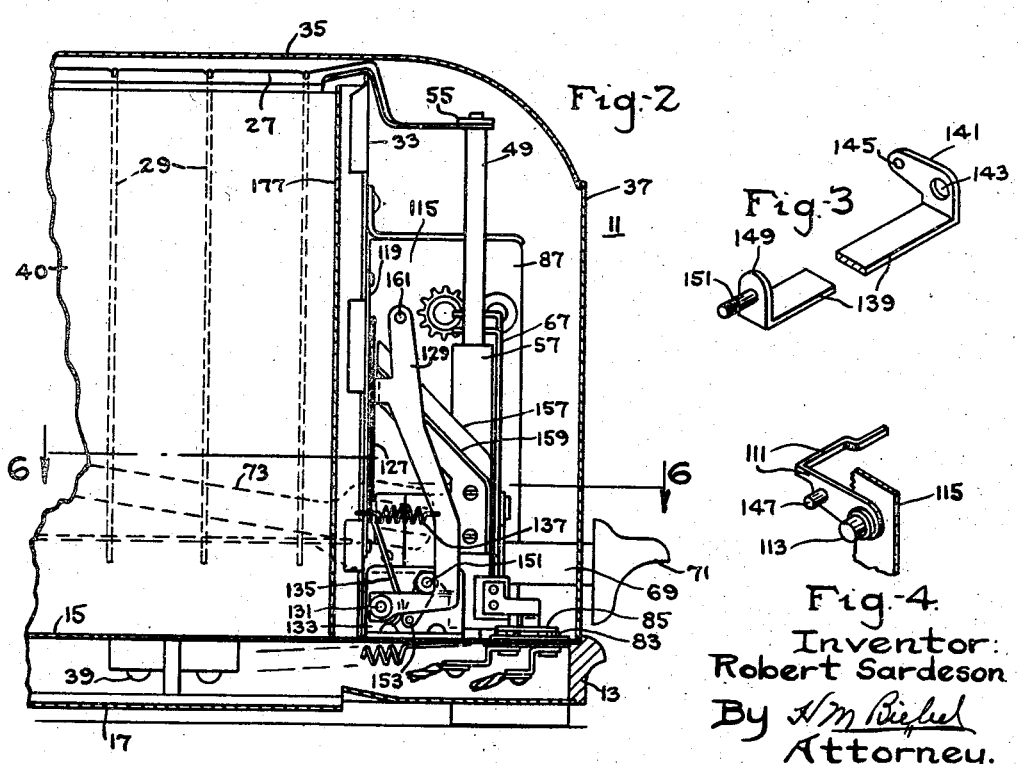
Inventor:
Robert Sardeson
By _____
Attorney.

June 20, 1939.  R. SARDESON  2,162,899
AUTOMATIC TOASTER
Filed Feb. 28, 1938  3 Sheets-Sheet 2

Inventor:
Robert Sardeson.
By H. M. Bickel
Attorney

June 20, 1939.　　　　R. SARDESON　　　　2,162,899
AUTOMATIC TOASTER
Filed Feb. 28, 1938　　　　3 Sheets-Sheet 3
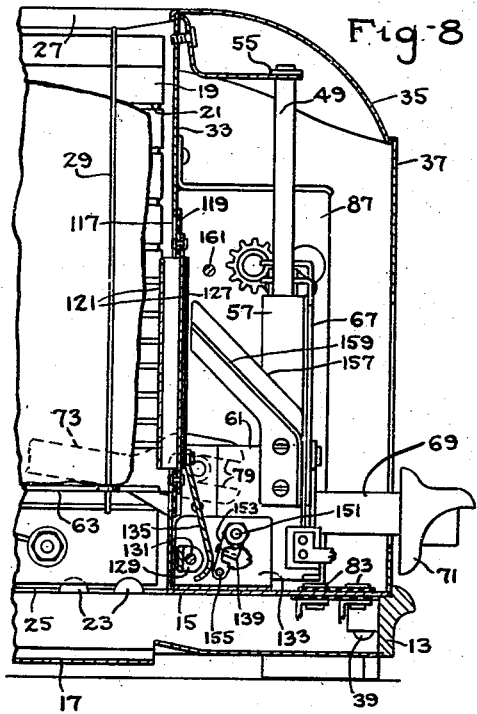
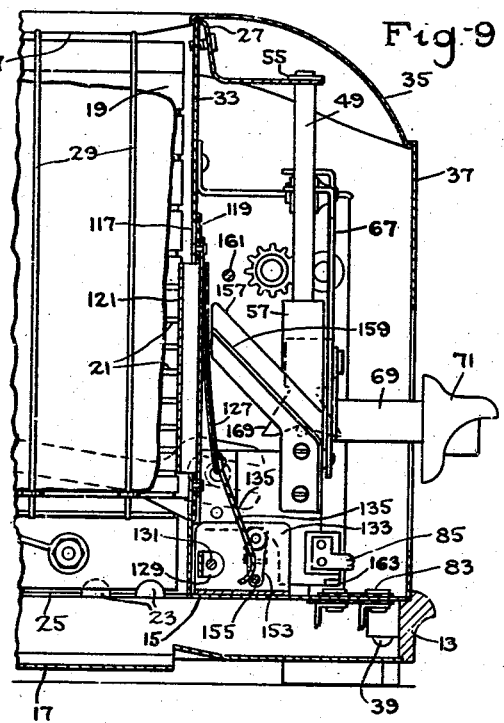
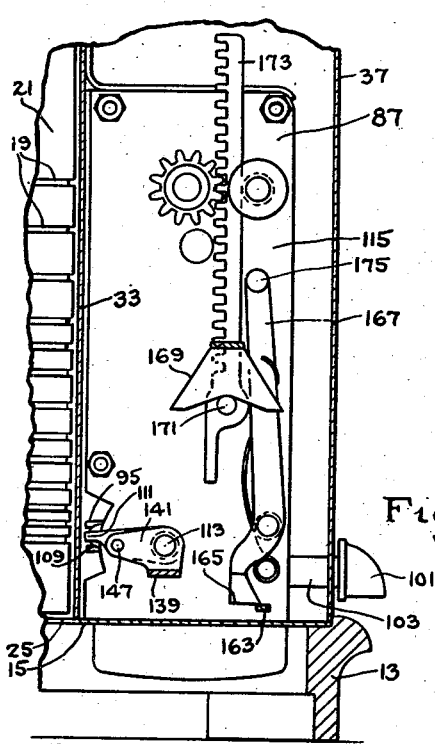
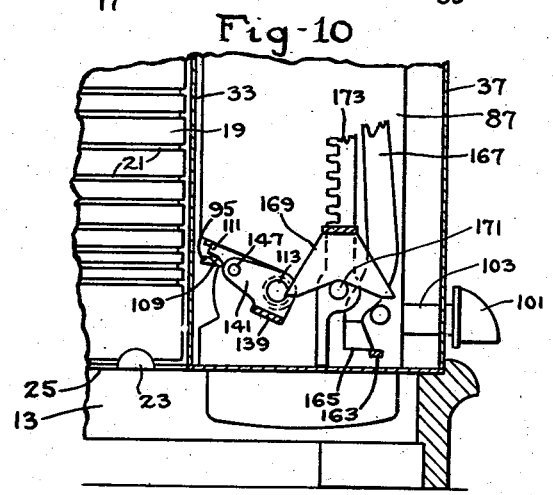
Inventor:
Robert Sardeson
By A. M. Biebel
Attorney Patented June 20, 1939

2,162,899

UNITED STATES PATENT OFFICE 2,162,899

AUTOMATIC TOASTER

Robert Sardeson, Minneapolis, Minn., assignor to McGraw Electric Company, Chicago, Ill., a corporation of Delaware Application February 28, 1938, Serial No. 193,096

15 Claims. (Cl. 219—19)

My invention relates to electric cooking appliances and particularly to automatic electric toasters.

One object of my invention is to provide an automatic toaster that shall embody a thermally controlled timing device operable to vary the position of a thermal element relatively to the heating means of the toaster in accordance with the operating conditions of the toaster.

Another object of my invention is to provide an automatic electric toaster including a mechanical timer having a thermally actuable control element, which element is located in close heat receiving relation to the heating means of the toaster during a toasting operation and farther away therefrom at other times.

Another object of my invention is to provide an automatic electric toaster that shall embody a thermally controlled timing device operable to vary the position of a thermal element relatively to the heating elements of the toaster by means controlled by the timing device.

Another object of my invention is to provide an automatic electric toaster that shall embody a timing device having a thermally actuable element movable relatively to the heating elements of the toaster toward and away from the heating means to cause the thermally actuable element to follow very closely the temperature conditions of a toasting chamber.

Other objects of my invention will either be apparent from a description of one form of device embodying my invention or will be pointed out in the course of such description or in the appended claims.

Figure 6:
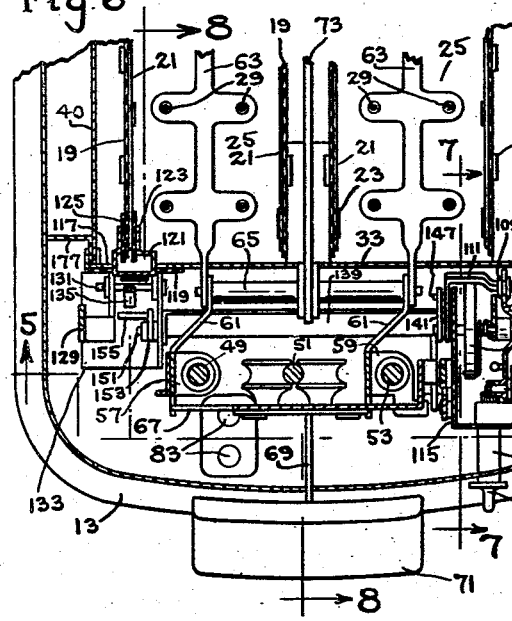
Figure 7:
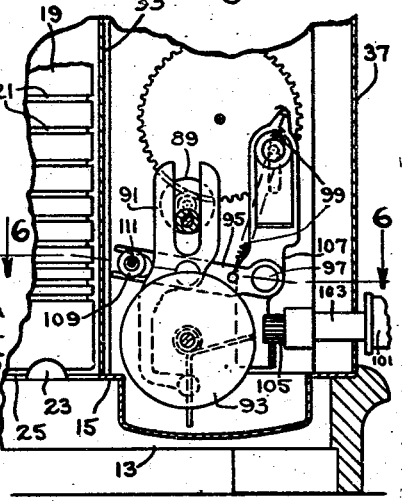

In the drawings,

Fig. 1 is a view in vertical longitudinal section through a toaster embodying my invention, taken on the line 1—1 of Fig. 5, with the parts shown in inoperative position, Fig. 2 is a view similar to Fig. 1 but showing the parts in operating position when cold, the rear portion of the toaster structure being omitted, Fig. 3 is a detail perspective view of one of the parts, Fig. 4 is a detail perspective view of another of the parts of the toaster, Fig. 5 is a view in front elevation, with the casing shown in section and taken on the line 5—5 of Fig. 6, Fig. 6 is a horizontal sectional view taken on the line 6—6 of Fig. 2 and on the line 6—6 of Fig. 7, Fig. 7 is an enlarged fragmentary vertical sectional view through the timer and a part of the toaster taken on the line 7—7 of Fig. 6, Fig. 8 is a fragmentary view, particularly of the front part of the toaster, in vertical longitudinal section on the line 8—8 of Fig. 6 and showing the parts at the start of a toasting operation when cold, Fig. 9 is a view similar to Fig. 8 showing the parts in the positions occupied by them when a toasting operation is partially completed and with the bimetal bar heated to an intermediate temperature, Fig. 10 is an enlarged fragmentary sectional view taken on the line 10—10 of Fig. 5 but showing the parts of the toaster in the same positions as occupied in Fig. 8 of the drawings, and, Fig. 11 is a sectional view similar to Fig. 10 but showing the parts of the toaster in the positions occupied by them under the conditions obtaining in Fig. 9 of the drawings, the parts being shown on an enlarged scale.

My invention is more particularly embodied in a particular form of thermally controlled timing mechanism and I have elected to show the same as being associated with a vertical oven-type toaster of the kind shown generally in Ireland Patent No. 2,001,362, but I do not desire to be limited thereto since my invention may be applied to other forms of automatic toasters.

A toaster assembly 11 comprises a skeleton base 13 which may be made of a suitable molded composition material and which has a bottom plate 15 secured thereto adjacent its upper edge and which may also have secured thereto a crumb tray 17 all in a manner now well known in the art.

A plurality of vertically extending planar heating elements each comprising one or more sheets 19 of electric insulating material such as mica on which is mounted a resistor 21 which may be either of wire or of strip and which is shown as having substantially all of its length positioned adjacent one side of the electric insulating supports in order that substantially all of the heat generated in the resistor may be at that side thereof facing a slice of bread to be toasted thereby. Pairs of such heating elements are spaced apart a suitable distance and are located one at each side of a slice of bread to be toasted thereby, now in a manner well known in the art. The bottom edge portions of the mica sheets may be held by bent-up lugs 23, these lugs being punched out of the bottom plate 15 adjacent longitudinally extending openings 25 therein which openings are provided to permit of a draft of cooling air flowing through the toaster structure.

The top edges of the heating elements may be held by side portions of top frame plates 27 extending longitudinally of the toaster structure and by upper return bent portions of guard wires 29. The rear ends of the frame plates 27, of which one is provided for each slice of bread, may be held by the upper edges of a rear intermediate plate 31, while the forward portions of the top frame plates 27 may engage with the top parts of front intermediate plates 33 all in a manner well known in the art. Each of these top frame plates are provided with openings therethrough to permit of insertion and removal of slices of bread to be toasted in the toaster structure. The outermost heating elements cooperate with the front and the rear intermediate plates to constitute the vertical walls of a toasting chamber, the bottom plate 15 constituting a bottom closure therefor and a cover member 35 of a casing constituting the top closure therefor, it being understood that the cover member 35 is also provided with openings extending longitudinally thereof for the insertion and removal of slices of bread. The casing includes further a plurality of vertically extending walls 37 which may be held on the frame 13 and against the bottom plate 15 in any suitable means here shown as screws 39. It may be pointed out that the front intermediate wall 33 cooperates with the front wall of the casing 37 and with side portions thereof to constitute a mechanism chamber. Baffle plates 40 (see Fig. 6) may be provided outside of the outermost heating elements.

The plurality of heating elements hereinbefore described are suitably electrically connected with each other and terminals 41 are insulatedly supported on the rear intermediate plate 31 near the bottom edge thereof and a twin conductor cord 43 is connected to the terminals and extends outwardly through the rear wall of the casing, an electric-insulating bushing 45 being provided in a manner well known in the art. A lifting knob 47 is secured to the rear wall of the casing to permit of carrying the toaster.

A plurality of vertical standards 49, 51 and 53 are positioned in the mechanism chamber, their lower ends interfitting with the bottom plate 15 and their upper ends being held by suitable means including forwardly extending portions of the top frame plates 27 and by a cross bar 55 in a manner now well known in the art. A slider 57 is vertically movable on standard 49 and a similar slider 59 is movable on standard 53. These sliders have rearwardly extending portions 61 which are adapted to be rigidly connected with bread slice supports 63 positioned between the respective pairs of heating elements hereinbefore described and movable from non-toasting into toasting position and vice versa during the operation of the toaster. The two sliders and their connected bread slice supports are further connected by a transversely extending rod 65 and it may be noted that the bread slice supports extend through a slot in the rear intermediate wall 31 and through a slot in the front intermediate wall 33.

A carriage 67 is slidably mounted on intermediate standard 51 and is so constructed and arranged that when it is moved downwardly it will cause downward movement of sliders 57 and 59 and the connected bread slice supports but that it can move upwardly independently of the sliders and the bread slice supports. Carriage 67 has a forwardly extending bar 69 secured thereto, the front portion of this bar extending outwardly through the front wall of casing 37 and an actuating knob 71 is mounted thereon.

Means for biasing the bread slice supports to their upper or non-toasting position includes a bellcrank lever having a long arm 73 and a short arm 75, which bellcrank lever is pivotally mounted at 77 on the rear intermediate plate 31. The front end of the longer arm 73 is provided with a slot 79 therein and rod 65 is adapted to be located in said slot so that when knob 71 is moved downwardly with resultant movement of the sliders, the bread slice supports and rod 65, arm 73 is turned in a clockwise direction as is also arm 75 whereby a biasing spring 81, one end of which is connected to arm 75 and the other end of which is connected to the forward portion of bottom plate 15, is placed in greater tension.

Means to control the energization of the heating elements includes a pair of contacts 83 insulatedly mounted on bottom plate 15 in the mechanism chamber and a contact bridging member 85 resiliently and insulatedly mounted on slider 57. When the sliders are in their upper position, as shown more particularly in Fig. 5 of the drawings, the switch is open and the heating elements are deenergized, but when the sliders and the bread slice supports are in their lowermost position contact bridging member 85 is in engagement with fixed contact members 83, as shown particularly in Fig. 2 of the drawings.

The means hereinbefore described comprises the means for initiating a toasting operation and include particularly the actuating knob 71, the parts moved thereby and the switch. Means for terminating a toasting operation including the device more particularly embodying my invention will now be described.

A variable speed mechanical timer 87 is positioned in the mechanism chamber, its location being particularly shown in Fig. 5 of the drawings, and this timer is of the kind disclosed and claimed in Ireland Patent No. 1,866,808 to which reference may be made for details of its construction and operation. Generally it includes a spring driven gear train driving an eccentric 89 (see Fig. 7 of the drawings) which eccentric causes movement of an oscillator 91 and reciprocal movement of a balance wheel 93 all as set forth in the above mentioned Ireland patent. Oscillator 91 is pivotally mounted on a lever arm 95, a pivot for which is shown at 97 in Fig. 7 of the drawings, this lever arm being biased by a spring 99 into a position where the speed of the timer will be a minimum.

Means for manually adjusting the speed of the timer includes a knob 101 mounted on a shaft 103 which shaft extends through an opening in the front part of casing 37 and has a pinion 105 secured thereto, which pinion is in engagement with a vertically movable bracket 107, this bracket carrying the pivot 97 hereinbefore described. It is thus possible to manually adjust the speed of the timer by turning movement of knob 101.

The free end of lever arm 95 is slotted as shown in Fig. 7 of the drawings and this slotted end is adapted to receive a roller 109 on the end of an L-shaped actuating arm 111, which arm is shown more particularly in Fig. 4 of the drawings. This arm 111 is loosely pivotally mounted on a pin 113 which pin is fixedly mounted in the left-hand side plate 115 of the timing mechanism.

Front intermediate plate 33 is provided with an opening 117 therein, which opening is shown shown more particularly in Figs. 8 and 9 of the drawings, this opening extending vertically of the plate and being alined with one of the heating elements hereinbefore described and in the particular embodiment shown in the drawings, it is alined, as may be seen by reference to Fig. 6 of the drawings, with the left-hand outer heating element. A strip of heat and electric-insulating material 119, such as mica, fits over the opening 117 and has an opening therein extending longitudinally thereof, which opening is closed by a heat receiving and heat transmitting metal member 121, of substantially channel shape in lateral section, the particular shape being shown in Fig. 6 of the drawings from which it will be noted that rearwardly extending portions 123 of member 121 are positioned in close heat receiving relation relatively to the front end of the heating element. Strips 125 of mica or other suitable electric insulating material are provided to electrically insulate the resistor 21 from the metal member 121. Suitable securing means are provided to hold the metal member 121 in the position shown in the drawings.

The variable speed mechanical timer 87 hereinbefore described is controlled by a bimetal bar 127, the preferred form of which is shown in Fig. 5 of the drawings and for further details of a compensating bimetal bar of this kind reference may be made to my copending application Serial No. 127,100 filed February 23, 1937 and assigned to the same assignee as is the present application. Generally the bimetal element 127 is of substantially L-shape and comprises a short leg and a longer leg. The bimetal element 127 is supported at the outer end of the shorter leg on a pivotally mounted lever arm 129 the shape of which is shown particularly in Figs. 1 and 2 of the drawings and which is pivotally mounted as at 131, which pivot is supported by a bracket 133 shown for instance in Figs. 1, 5, 8 and 9. The outer end of the longer leg of the bimetal element has secured thereto an actuating bar 135 extending downwardly, the lower end of this bar being rounded so that the arm 129 and the bimetal element carried thereby may move on the pivot pin without changing the position of the outer end thereof relatively to the pivot pin. A biasing spring 137 is connected to arm 129 intermediate its ends and to front intermediate plate 33 to normally bias the arm in a counterclockwise direction, in which position of the arm bimetal bar 127 will be located closely adjacent to and in close heat receiving relation to metal member 121.

Fig. 3 of the drawings illustrates a connecting member 139 having an upturned end portion 141 at its right-hand end which portion 141 is provided with an opening 143 adapted to receive the outer end of pin 113 to pivotally support member 139 at its right-hand end. A second opening 145 is provided in portion 141 which opening is adapted to fit over a crank pin 147 in member 111 so that turning movement of member 139, to be hereinafter described, causes a turning movement of member 111 on pin 113 and thereby a change in the speed of the timer. The left-hand end of member 139 is provided with a lateral extension 149 adjacent the outer end of which there is provided a stub shaft or pin 151 fixed in portion 149. This pin 151 extends through bracket 133 and has rigidly mounted thereon a crank arm 153 with a crank pin 155 therein, which crank pin 155 is adapted to be engaged by the rounded outer end of actuating bar 135 so that counterclockwise movement (as seen in Figs. 1 and 2 of the drawings) of the bimetal element will cause a counterclockwise movement of arm 153 and of portion 141 as well as of the arm 111 actuated thereby, this resulting in an increase in speed of the timer in accordance with an increase in temperature of the bimetal element itself.

The bimetal element 127 is adapted to be located in the position shown in Fig. 2 of the drawings during a toasting operation, that is, close to the heat transmitting plate 121, and is to be located in the position shown in Fig. 1 of the drawings at all other times and particularly at times other than during a toasting operation. In order to effect such location controlled jointly by the initiating means which includes more particularly the actuating knob 71 and the sliders and bread slice supports connected therewith and by the terminating means which includes more particularly the timer, left-hand slider 57 has secured thereto a cam surface 157 which is of the shape shown in Figs. 1, 2, 8 and 9 of the drawings and includes an angularly extending rib 159 which rib has a vertically extending portion. Arm 129 has a pin 161 secured thereto and extending toward cam member 157 this pin being adapted to ride on the rib 159. When the parts are in their non-operating position as shown in Fig. 1 of the drawings the pin 161 is in the position shown in Figs. 1 and 5 of the drawings where it engages the vertically extending portion of rib 159, biasing spring 137 being under an increased tension. If now an operator moves knob 71 downwardly until the bottom limit of travel is reached the arm 129 will have been moved to its extreme position in a counterclockwise direction, bimetal element 127 being thereby positioned closely adjacent to metal member 121, any suitable stopping means being provided to limit this turning movement of arm 129 and of the bimetal carried thereby.

When the sliders have been moved to their lowermost position an extension 163 on right-hand slider 59 engages under the detent end 165 of a latch arm 167 pivotally mounted on timer mechanism 87. Carriage 67 is provided with a lateral extension 169 thereon adapted to engage a pin 171 on a rack bar 173 so that downward movement of carriage 67 will cause winding of the timer as well as closing of the energizing switch for the heating elements and lowering of the bread slice supports into toasting position, all of this being old and well known in the art.

Assuming that it is desired to operate the toaster, starting cold, the operator will plug in the cord 43, place a slice of bread on each bread slice support, then in the positions shown in Fig. 1 of the drawings, and will then depress knob 71 moving the bread slice supports downwardly, winding the timer and energizing the circuit. The energized heating elements will cause toasting of the bread slices and since heat receiving and transmitting member 121 is in very close heat receiving relation to one of the heating elements its temperature will increase with the temperature of the resistor and since these resistors are operated at relatively high temperatures, on the order of 1100° F. or more, it is obvious that the temperature of member 121 will become relatively high so that bimetal element 127 will have its temperature raised to a relatively high value. One of the causes of the success of a device of this kind is that the temperature of the bimetal element is raised to a value on the order of 400° F. or even higher, thereby making it more sensitive than would be the case if its temperature were raised to a lower value. The lower end of the heated bimetal bar will move in a counterclockwise direction, as shown in Fig. 9 of the drawings, so that the rounded end of member 135 will cause a turning movement of arm 153 with resultant change in the position of the oscillator, as has already been hereinbefore set forth, and an increase in the speed of the timer, thereby reducing the duration of a toasting operation. When member 169 has reached substantially the upper limit of its travel its upper surface will engage a pin 175 on the upper end of latch arm 167 whereby to cause it to move and effect disengagement of detent 165 and member 163 on the slider whereby quick upward movement of the bread slice supports is effected with simultaneous opening of the current switch for the heating elements.

Upward movement of the sliders causes upward movement of cam 157 and after a short amount of upward travel of cam 157 pin 161 is engaged therewith causing a turning movement of arm 127 and bimetal element 127 supported thereby in a clockwise direction or away from the member 121 which, as has already been set forth, has reached a relatively high temperature. In other words, as soon as a toasting operation has been automatically terminated, the bimetal element which was positioned closely adjacent to a heating member during the toasting operation is moved away from this high temperature zone into a zone of much lower temperature. Since, as was hereinbefore set forth, the temperature of the bimetal element was raised to a relatively high value its rate of decrease of temperature will be relatively high so that its temperature will be quickly reduced and even though another toasting operation be initiated within a few seconds after the termination of a preceding operation, it has been found that the temperature of the bimetal element has been sufficiently reduced in that short time to cause member 135 to move out of engagement with pin 155 so that the timer will start at normal speed without being under the control of the thermally actuable element. It is of course possible that if a toaster of this kind is operated a large number of times in immediate succession, and particularly on unusually high voltage energizing circuits, the timer will be under the control of the thermally actuable element even at the beginning of a toasting operation. As noted before however it has been found that the thermally actuable element can be so designed, constructed and located that successive slices of bread can be toasted to substantially the same degree without the necessity of any manual adjustment of the timer, so that manual control of the timer may be confined to obtaining "light", "intermediate" or "dark" slices of toast.

Actual tests on a toaster of this kind have shown that a device of this kind will operate in the manner described above to obtain the desired uniform toasting as set forth hereinbefore.

In the device shown in the drawings, the movably supported thermal element is located in the mechanism chamber and I wish to point out that there is no through draft of cooling air passing through this chamber. There may, of course, be stray or undirected convection currents of air in the mechanism chamber. In order to prevent any appreciable volume of air either entering or leaving the mechanism chamber, I prefer to provide lateral baffles 177 (see Fig. 6) between the side baffles 40 and the side walls of the casing, the baffles 177 being aligned laterally with the front intermediate plate 33.

While I have illustrated a two-slice toaster, the thermally actuable control therefor is not limited to a toaster for toasting only two slices of bread at one time but may be applied to any similar toaster effective to operate on one or any number of slices of bread. It has further been found that the openings in the bottom plate and the openings in the top frame plates and the cover cause an appreciable through-draft of cooling air to flow into and out of the toasting chamber in a substantially upward direction and it may be noted that this through-draft of cooling air will flow past the portions 123 of metal member 121 so that this metal member is most effectively cooled during the interval of time between toasting operations. It is thus apparent that even if bimetal element 127 were not cooled as much as member 121 during an interval between successive toasting operations, it would initially be cooled by member 121 during the first few seconds of a toasting operation after which of course member 121 would again cause a temperature rise of the bimetal element.

I do not desire to be limited to the position of bimetal element 127 shown in the drawings since it is obvious that it may be located in any position in the toaster where it will be under the influence of relatively high temperature heat from the heating elements and can be moved away from such position during the intervals of time between successive toasting operations. Thus instead of positioning the bimetal element in the mechanism chamber or in some similar portion of the toaster structure outside of the toasting chamber, I may position it within the toasting chamber during the toasting operation and move it substantially outside of said chamber at other times.

It is to be understood that various modifications may be made in the structure generally embodying my invention without departing from the spirit and scope thereof and such changes are intended to be covered by the appended claims which are to be limited only by the prior art.

I claim as my invention:

1. An automatic toaster comprising a heating element, means to initiate a toasting operation and means to terminate a toasting operation, said terminating means including a single pivotally mounted thermostat and means including a timing device and a cam surface controlled thereby for operatively engaging said thermostat to limit location of the thermostat in a high temperature zone created by said heating element to the duration of a toasting operation.

2. An automatic toaster comprising a heating element energizable to its full capacity only during a toasting operation, means to initiate a toasting operation and means to terminate a toasting operation, said terminating means including a single pivotally mounted thermostat biased to close heat receiving position relatively to said heating element and means on said terminating means and including a cam surface operatively engageable with the thermostat to determine the position of said thermostat relatively to said heating element.

3. An automatic toaster comprising a heating element energizable to its full capacity only during a toasting operation, means to initiate a toasting operation and means to terminate a toasting operation, said terminating means including a pivotally mounted thermostat biased to close heat receiving position relatively to said heating element and means operatively associated with said terminating means and including a cam surface controlled thereby operatively engageable with said thermostat to cause movement of said thermostat against its bias at the termination of each toasting operation.

4. An automatic toaster comprising a heating element energizable to its full capacity only during a toasting operation, means to initiate a toasting operation and means to terminate a toasting operation, said terminating means including a pivotally mounted thermostat biased to close heat receiving position relatively to said heating element, a slider reciprocally movable by said initiating means at the start and by said terminating means at the end of a toasting operation in a predetermined path and through a fixed distance and means on said slider acting on said pivotally mounted thermostat to vary its position relatively to said heating element at the start and at the end of each toasting operation.

5. An automatic toaster comprising a heating element energizable during a toasting operation only, means to initiate a toasting operation and means to terminate a toasting operation, said terminating means including a pivotally mounted thermostat, a variable speed mechanical timer controlled by said thermostat and means including said timer and a cam surface controlled thereby and operatively engageable with said thermostat for limiting the location of said thermostat in a high heat zone created by said heating element to the duration of a toasting operation.

6. An automatic toaster comprising a heating element energizable during a toasting operation, means to initiate a toasting operation and means to terminate a toasting operation, said terminating means including a pivotally mounted thermostat, biased to close heat receiving position relatively to said heating element, a variable speed mechanical timer the speed of which is controlled by said thermostat and means including said timer and a cam surface controlled thereby for limiting the location of said thermostat closely adjacent to said heating element to the duration of a toasting operation.

7. An automatic toaster comprising a planar heating element, means to initiate a toasting operation and means to terminate a toasting operation, said terminating means including a variable speed mechanical timer, a thermostat connected to control the speed of said timer and having a pivotally mounted biased support for positioning it in alinement with the plane of said heating element and adjacent one edge thereof and movable means including a cam surface controlled by said timer for causing a pivotal movement of the thermostat away from said heating element simultaneously with the termination of a toasting operation.

8. In an automatic toaster the combination with an electric heating element, a control switch therefor, a bread slice support movable into toasting and non-toasting position, means biasing the bread support to non-toasting position, a variable speed mechanical timer, a reciprocally movable slider, means for manually moving said slider and bread slice support in one direction, causing closing of said switch and winding of said timer, a detent operatively engageable by said slider to hold the switch in closed position and the bread slice support in toasting position, a bimetal bar connected to control the speed of said timer and subject to heat from the heating element, a pivotal mounting for said bimetal bar biasing the bimetal bar toward said heating element and means on said slider acting on said pivotal mounting when the slider is moved in the opposite direction to cause movement of the bimetal bar away from the heating element.

9. An automatic toaster comprising a heating element, manually actuable means to initiate a toasting operation and automatic means to terminate a toasting operation, said terminating means including a variable speed mechanical timer and a pivotally mounted thermostat for controlling the speed of said timer and means including a cam surface controlled in alternate sequence by said initiating and by said terminating means for causing movement of the thermostat toward and away from said heating element.

10. An automatic toaster comprising a front wall, a rear wall, spaced planar heating elements cooperating with said front and rear walls to define a toasting chamber, an opening in the front wall adjacent one of said heating elements, a metal member of relatively small thermal capacity and of high heat conducting capacity in close heat receiving relation to said one heating element, means to initiate a toasting operation and means to terminate a toasting operation, said terminating means including a variable speed mechanical timer, a bimetal bar for controlling the speed of said timer, a pivotal mounting for said bimetal bar biased into close heat receiving relation to said metal member and means controlled in alternation by said initiating and by said terminating means for causing movement of the thermostat toward and away from said metal member.

11. An automatic toaster comprising a front wall, a rear wall, spaced planar heating elements cooperating with said front and rear walls to define a toasting chamber, an opening in the front wall adjacent one of said heating elements, a metal member of relatively small thermal capacity and of high heat conducting capacity in close heat receiving relation to said one heating element, means to initiate a toasting operation and means to terminate a toasting operation, said terminating means including a variable speed mechanical timer, a bimetal bar for controlling the speed of said timer, a pivotal mounting for said bimetal bar biased into close heat receiving relation to said metal member and means controlled in alternation by said initiating and by said terminating means for causing the thermostat to be positioned closely adjacent to said metal member during a toasting operation and farther away from said metal member during other times.

12. In an automatic toaster the combination with a casing, electric heating elements in said casing, walls cooperating with certain of said heating elements to constitute a toasting chamber, a switch controlling the energization of said heating elements, a bread slice support in the toasting chamber movable into toasting and non-toasting position relatively to the heating elements, a variable speed mechanical timer, slider and carriage means reciprocally movable in said casing and operatively connected with the switch, the bread slice support and the timer, movement of the slider and carriage means in one direction causing closing of the switch, movement of the bread slice support into toasting position and winding of the timer, and a latch, actuable by said timer after a time period, for holding the slider means in its operated position, one of the walls of the toasting chamber having an opening therein adjacent to one of said heating elements, of a metal member of relatively small thermal mass and of high heat conductivity positioned in said opening in close heat receiving relation with said one heating element, a bimetal bar outside of the toasting chamber connected to control the speed of said timer, a pivoted arm supporting said bimetal bar spring biased to position the bimetal bar closely adjacent to said metal member, a cam on said slider means cooperating with the pivoted arm to cause the pivoted arm to position the bimetal bar closely adjacent to the metal member during the time that the switch is closed and to position the pivoted arm to position the bimetal bar out of close heat receiving relation to said metal member during the time that the switch is open.

13. A device as set forth in claim 10 in which said metal member is subjected to a through draft of cooling air traversing said toaster.

14. A toaster as set forth in claim 12 in which a part of said metal member extends into the toasting chamber and is subjected to a draft of cooling air flowing through said toasting chamber.

15. An automatic electric toaster including a heating element, means for initiating a toasting operation and means for terminating a toasting operation, said terminating means including a timing device having a thermally actuable element connected therewith to control its operation, biased into close heat receiving position adjacent said heating element during a toasting operation and movable out of said close heat receiving position by means controlled by said timing device coincident with the termination of a toasting operation.

ROBERT SARDESON.